Feb. 28, 1950     E. H. BODDY     2,499,179
SUPPORT FOR FOOD STORAGE RECEPTACLES
Filed Sept. 14, 1946     3 Sheets-Sheet 1
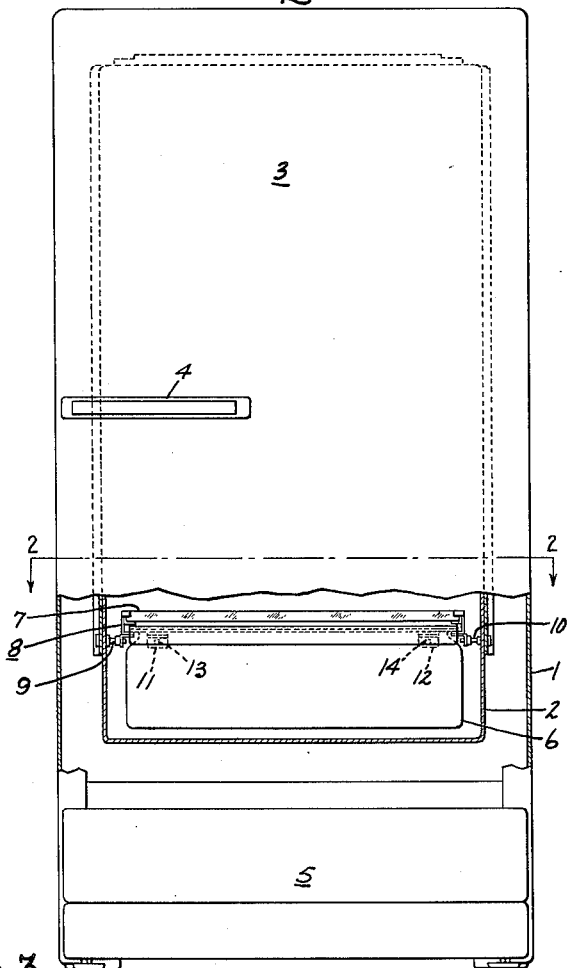
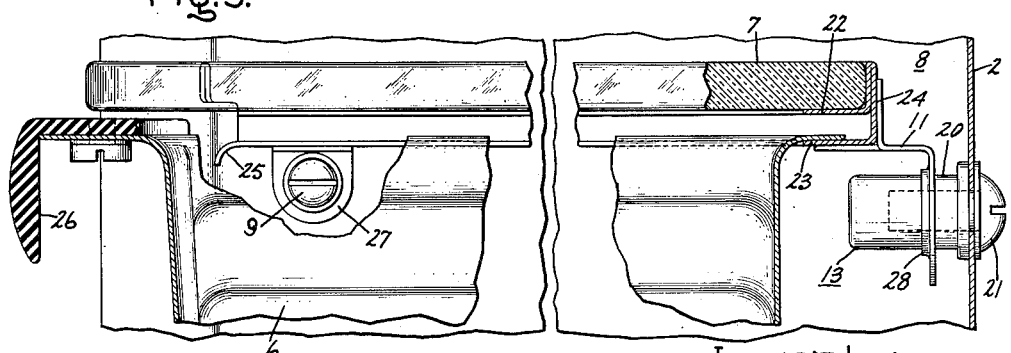
Inventor:
Edwin H. Boddy,
by Edwin Rich
His Attorney.

Feb. 28, 1950 E. H. BODDY 2,499,179
SUPPORT FOR FOOD STORAGE RECEPTACLES
Filed Sept. 14, 1946 3 Sheets-Sheet 2

Inventor:
Edwin H. Boddy,
by Edwin L. Rich
His Attorney.

Feb. 28, 1950 E. H. BODDY 2,499,179
SUPPORT FOR FOOD STORAGE RECEPTACLES
Filed Sept. 14, 1946 3 Sheets-Sheet 3

Inventor:
Edwin H. Boddy,
by Edwin L. Rich
His Attorney.

Patented Feb. 28, 1950

2,499,179

UNITED STATES PATENT OFFICE 2,499,179

SUPPORT FOR FOOD STORAGE RECEPTACLES

Edwin H. Boddy, Erie, Pa., assignor to General Electric Company, a corporation of New York Application September 14, 1946, Serial No. 697,135

7 Claims. (Cl. 312—150)

1

My invention relates to food storage receptacles for use in refrigerators and the like and more particularly to an improved arrangement for supporting a food storage receptacle and a cover therefor.

Many refrigerators use sliding food storage receptacles in the bottom of the food storage compartment. These food storage receptacles are usually supplied with a cover which assists in maintaining the proper humidity for the preservation of fruits and vegetables stored therein. It is therefore necessary to provide a support on which the food storage receptacle may rest in sliding relationship and also to provide a support for the cover. In manufacturing refrigerators in quantity, there is frequently a slight variation in the width of the interior of the cabinet, in the width of the food storage receptacle and in the width of the cover. Accordingly, it is an object of my invention to provide a support for the food storage receptacle and the cover which can be easily adjusted to take care of such variations.

It is another object of my invention to provide a food storage receptacle and cover support which will insure free sliding of the receptacle despite any slight variation in the dimensions of the parts of the assembly.

Further objects and advantages of my invention will become apparent as the following description proceeds, and the features of novelty which characterize my invention will be pointed out with particularity in the claims annexed to and forming a part of this specification.

Figure 2:
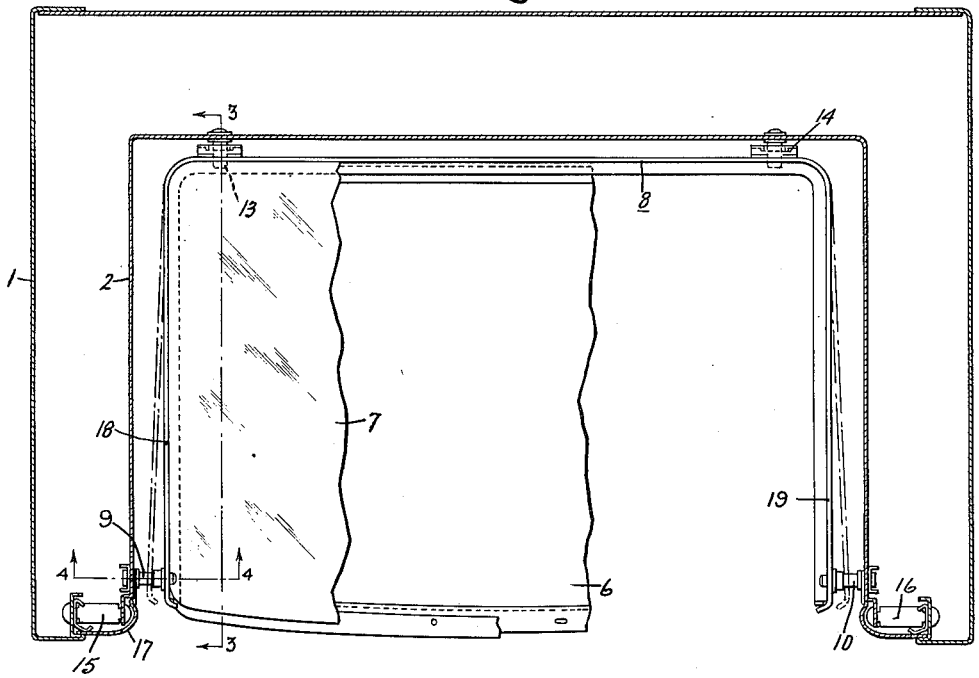
Figure 4:
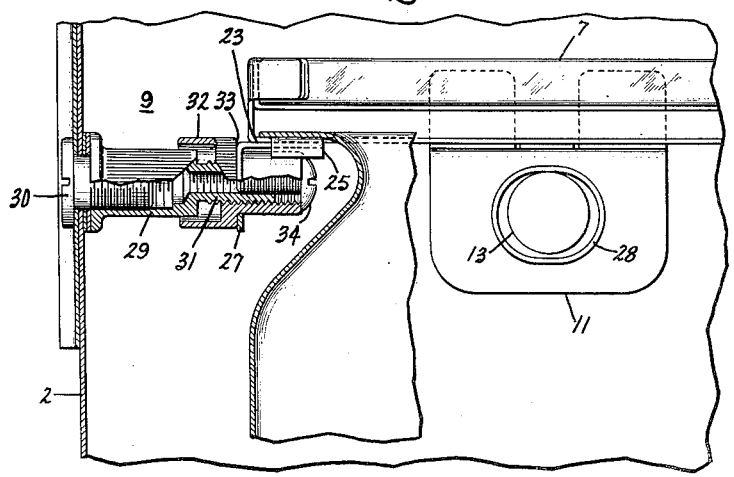
Figure 5:
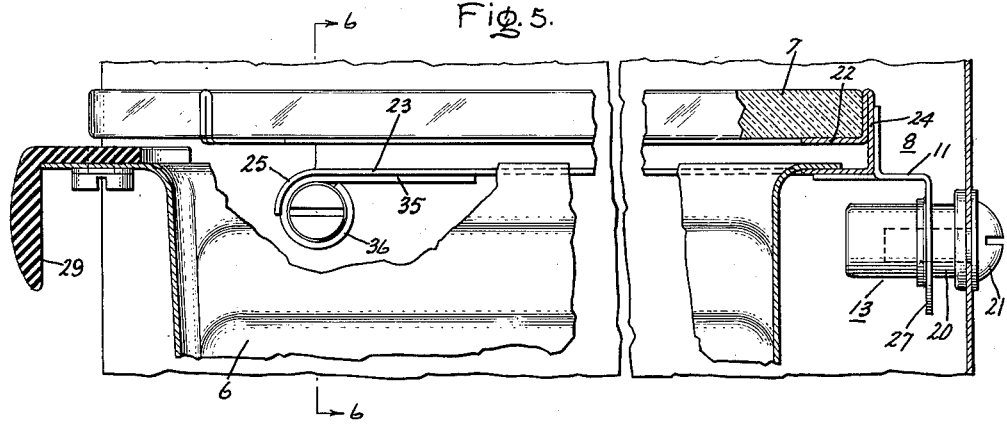
Figure 6:
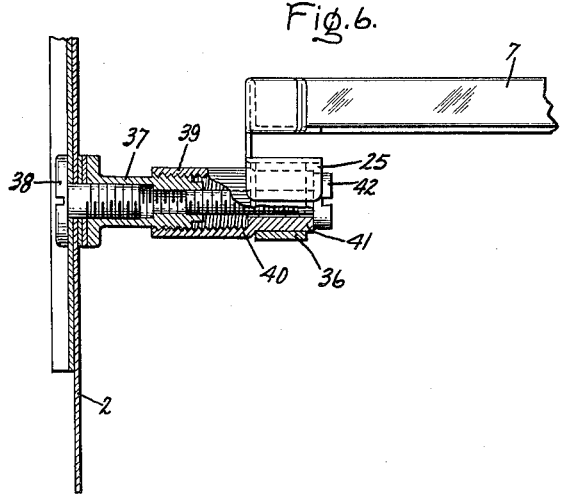

For a better understanding of my invention, reference may be had to the accompanying drawings in which Fig. 1 is a front elevation view, partly broken away, of a refrigerator cabinet provided with a support embodying my invention; Fig. 2 is a plan view taken along the line 2—2 of Fig. 1, also partly broken away to show various details; Fig. 3 is a sectional view taken along the line 3—3 of Fig. 2 in which some portions are broken away for greater clarity; and Fig. 4 is a sectional view partly broken away taken along the line 4—4 of Fig. 2 showing details of the mounting arrangement; Fig. 5 shows a modified form of the support; and Fig. 6 is a sectional view taken along the line 6—6 of Fig. 5.

Referring to the drawings, I have shown in Fig. 1 a refrigerator cabinet including an outer metal shell 1 and an inner metal liner 2. The refrigerator is provided with a door 3 having a handle 4 and also with a machinery compartment cover 5. In the broken-away portion of this drawing, I have shown a food storage receptacle 6, suit-

2 able for the storage of fruits, vegetables, etc. A cover 7, which is composed of glass or any other suitable material, is provided in order to maintain the proper humidity for the preservation of the food stored in the receptacle 6. The receptacle and cover rest on a frame or support 8. The frame 8 is substantially U-shaped, the open side being placed toward the front of the cabinet to permit slidable reception of the food storage receptacle. The frame is held in position on supporting members or studs 9 and 10 which project inwardly from opposite sides of the liner of the refrigerator cabinet, and is also provided with depending members 11 and 12 which rest on supporting members or studs 13 and 14 projecting from the back of the liner.

Referring now to the enlarged view shown in Fig. 2, I have there illustrated the outer shell 1 and the inner liner 2 connected by spacers 15 and 16. I also provide a breaker strip 17 of heat insulating material, which covers the space between the outer shell and the inner liner along the door frame of the refrigerator cabinet. The arrangement for connecting the inner liner and outer shell by the spacer members is not part of the present invention, but is described and claimed in my copending application, Serial No. 700,901, filed October 3, 1946, and assigned to the same assignee as the present invention. The frame 8 is generally U-shaped and has elements or arms 18 and 19 which extend along the sides of the refrigerator cabinet. The frame is supported on the members 9 and 10 projecting from the sides of the liner and on the members or studs 13 and 14 projecting from the back of the liner. The studs 13 and 14 are fixed in position, but one or both of the studs 9 and 10 are made adjustable longitudinally so that the position of the arms may be varied with respect to the side walls of the liner 2. I have shown in this figure both the studs 9 and 10 as being of the adjustable type, but in some cases it may be sufficient to provide an adjustable stud on one side only.

The arms 18 and 19 are made of a material having suitable resilience so that the arms spring outwardly toward the sides of the cabinet. This is illustrated by the dotted line position of the outer edge portions of these arms shown in Fig. 2, the remainder of the structure being omitted for purposes of clarity.

Referring now to the enlarged view shown in Fig. 3, it will be seen that the stud 13 is composed of two portions, an interiorly threaded portion 20 and a screw 21 which cooperates with the member 20 to clamp the stud in position against the liner 2. The stud 14 is of corresponding construction. It can be seen from this figure that the frame 8 is formed to provide two horizontally extending portions 22 and 23 for supporting the cover and the food storage receptacle respectively. The frame is further formed with a vertical portion 24 which extends above the horizontal portion 22 for preventing horizontal displacement of the cover. The ends of the vertical portion 24 extend inwardly to prevent horizontal displacement of the cover toward the front of the cabinet.

In order to provide for easy insertion of the food storage receptacle should it be completely removed, the front edge of the horizontal portion 23 is curved downwardly as indicated at 25. The food storage receptacle is provided with a decorative portion 26 connected to its front edge in order that the pan may be easily grasped for sliding. A depending member 27 is secured to the horizontal portion 23 adjacent the stud 9 and fits over this stud to hold the front edge of the frame 8 in position. The exact construction of the stud and its relationship with the depending member 27 will be more clearly pointed out in the description of Fig. 4. The depending member 11 previously referred to is secured to the edges 23 and 24 of the frame 8 and is provided with an opening 28 which fits over the end of the stud 13 to hold one corner of the frame 8 in position.

Referring now to Fig. 4, it can be seen that the stud 9 includes a post 29 which is fastened to the liner 2 by a screw 30. The post 29 is provided with a portion 31 of reduced diameter. An adjustable element or sleeve 32, which is formed to provide an annular shoulder 33, is threaded on the post 29 so that the shoulder 33 may be adjusted longitudinally of the post 29. In order to lock the sleeve 32 in the adjusted position, there is provided a screw 34 which is threaded into the reduced section 31 of the post 29. From this figure, it can be seen that the depending member 27 fits around the end of the stud 9 and bears against the shoulder 33. The stud 10 at the opposite side of the refrigerator cabinet may be of the same construction as the stud 9 or it may be a non-adjustable type.

The member 11, which cooperates with the stud 13 to position one of the rear edges of the support, is shown in detail in Fig. 4. The opening 28 in the member 11, and the corresponding opening in member 12, are made somewhat longer in a horizontal direction for the purpose of allowing for variations in the spacing of the studs 13 and 14 or for variations in the location of the members 11 and 12.

To assemble the frame 8 in position, the members 11 and 12 are inserted over the studs 13 and 14. The arms 18 and 19 are then pressed inwardly and fitted over the studs 9 and 10. The arms are released and their natural resilience will cause them to bear against the shoulders 33. The pan may then be inserted along the portion 23 of the frame 8, and the cover 7 may be placed in position on the horizontal portion 22 of the frame 8. Should it be found that through slight inaccuracies in manufacture either the pan or the cover is too large to fit in the space provided, a simple adjustment of the position of the shoulder 33 of the stud 9 can be made by first loosening the screw 34 and then screwing the sleeve 32 toward the side of the cabinet. When the proper adjustment has been made, the screw 34 is tightened to lock the members in their adjusted position. If the stud 10 is made of the adjustable type, the necessary total adjustment is divided between the two studs so as to maintain the frame centrally located. Conversely, if the pan or the cover should be found to be too small, this can be compensated by adjusting the sleeve 32 in the opposite direction to reduce the area between the arms 18 and 19 of the support 8.

The modification shown in Fig. 5 is of substantially the same construction as that shown in Fig. 3 except that a different arrangement is used to mount the frame 8 on the adjustable stud. The same numerals have been applied to corresponding parts in the two figures. Referring now to Fig. 5, a flat strip or member 35 having a loop 36 at one end is secured to the horizontal portion 23 of the support 8. The inside diameter of the loop 36 is made substantially the same as the outside diameter of the mounting portion of the adjustable stud, and the loop 36 fits closely about a substantial length of the adjustable stud.

In Fig. 6 I have shown a modified form of the adjustable stud. In this form a post 37 is mounted on the inner liner of the refrigerator by a screw 38. In order to provide for adjustment, a sleeve or element 39 is threaded internally to engage with external threads on the post 37. The construction shown in this modification permits a greater range of adjustment than the construction shown in Fig. 4. The sleeve 39 is provided with a shoulder 40 against which the loop 36 is resiliently pressed and with a portion 41 of reduced diameter around which the loop 36 fits. A screw 42 is threaded into the post 37 to lock the assembly in the adjusted position.

Reference to Figs. 5 and 6 shows that the loop 36 fits closely about a substantial length of the mounting portion 41 of the adjustable stud and that it has a wide area of contact with the stud. By arranging the frame to rest directly on the stud as shown in Figs. 5 and 6 any tendency of the support to bend under the weight of material stored in the pan 6 is minimized and a flat horizontal surface for free sliding of the pan is insured.

While I have shown a particular embodiment of my invention in connection with a food storage receptacle for a household refrigerator, I do not desire my invention to be limited to the particular construction shown and described and I intend in the appended claims to cover all modifications within the spirit and scope of my invention.

What I claim as new and desire to secure by Letters Patent of the United States is:

1. In a refrigerator cabinet, a support for a food storage receptacle comprising an adjustable member attached to the interior of the cabinet, and a frame mounted in said cabinet and having an arm resiliently biased against said member for retaining said frame and said member in engagement, said frame including a portion for supporting the food storage receptacle.

2. In a refrigerator cabinet, a mounting assembly for a food storage receptacle comprising a supporting member attached to the interior of the cabinet, said supporting member including an adjustable element, a frame mounted on said supporting member, said frame having thereon a support for the food storage receptacle, and an arm on said frame resiliently biased against said adjustable element for retaining said frame in position on said supporting member.

3. In a refrigerator cabinet, a support for a food storage receptacle and cover comprising a member secured to the interior of the cabinet, said member including an adjustable element, means for adjusting the position of said element, and a frame mounted in said cabinet and having a portion biased against said element for retaining said frame in position on said member, said frame being formed with a first horizontally extending portion for slidably supporting the food storage receptacle and a second horizontally extending portion for supporting the cover.

4. In a refrigerator cabinet, a support for a food storage receptacle comprising a member secured to the interior of the cabinet, said member including an adjustable element, means for adjusting the position of said element, means for locking said element in the adjusted position, and a frame mounted in the cabinet and having a portion biased outwardly against said element, said frame including a horizontally extending portion for slidably supporting the food storage receptacle.

5. An arrangemnt for supporting a sliding food storage receptacle and cover in a refrigerator cabinet comprising a U-shaped frame extending along the two sides and back of the cabinet, said frame having a horizontal and a vertical portion for holding the cover in place and a second horizontal portion for supporting the food storage receptacle, and members connected to said cabinet at each side thereof, at least one of said members including an adjustable element, said frame including at least one resilient portion biased against said adjustable element.

6. In a refrigerator cabinet, a liner for the cabinet, a plurality of members projecting from the walls of said liner, a support for a food storage receptacle comprising a frame mounted on said members, at least one of said members including an adjustable element, said frame including a portion resiliently biased outwardly against said adjustable element.

7. In a refrigerator cabinet, a liner for the cabinet, a plurality of members projecting from the walls of said liner, at least one of said members including an adjustable element, a U-shaped frame for supporting a food storage receptacle, said frame being mounted on said members, said frame having a resilient portion along at least one side of the cabinet biased against said adjustable element whereby the size of said frame member may be varied by adjusting the position of said adjustable element.

EDWIN H. BODDY.

REFERENCES CITED

The following references are of record in the file of this patent:

UNITED STATES PATENTS

| Number | Name | Date |
| --- | --- | --- |
| 1,768,598 | Hofferberth | July 1, 1930 |
| 2,292,865 | Boddy | Aug. 11, 1942 |